US012486869B2

(12) United States Patent
Park

(10) Patent No.: US 12,486,869 B2
(45) Date of Patent: Dec. 2, 2025

(54) BALL CAGE ASSEMBLY DEVICE FOR VEHICLE HUB BEARINGS

(71) Applicant: Kyu Sik Park, Changwon-si (KR)

(72) Inventor: Kyu Sik Park, Changwon-si (KR)

( * ) Notice: Subject to any disclaimer, the term of this patent is extended or adjusted under 35 U.S.C. 154(b) by 121 days.

(21) Appl. No.: 18/407,460

(22) Filed: Jan. 9, 2024

(65) Prior Publication Data
US 2025/0043823 A1 Feb. 6, 2025

(30) Foreign Application Priority Data
Aug. 3, 2023 (KR) .................. 10-2023-0101654

(51) Int. Cl.
*F16C 43/06* (2006.01)
*F16C 33/38* (2006.01)

(52) U.S. Cl.
CPC ........ *F16C 33/3887* (2013.01); *F16C 43/065* (2013.01)

(58) Field of Classification Search
CPC ......... F16C 43/04; F16C 43/06; F16C 43/065
See application file for complete search history.

(56) References Cited

U.S. PATENT DOCUMENTS

| | | | | | |
|---|---|---|---|---|---|
| 1,401,680 A | * | 12/1921 | Dlesk | ...................... | F16C 33/42 29/809 |
| 1,627,965 A | * | 5/1927 | Gamble | .................. | F16C 43/06 29/724 |
| 2,288,023 A | * | 6/1942 | Ortegren | ................. | F16C 43/06 269/68 |
| 2,311,251 A | * | 2/1943 | Elliott | ..................... | F16C 43/06 222/246 |
| 2,407,016 A | * | 9/1946 | Kalister | .................. | F16C 43/06 221/68 |
| 3,135,041 A | * | 6/1964 | Knobel | ................... | F16C 43/04 29/898.062 |
| 3,378,166 A | * | 4/1968 | Hoffman | ................. | F16C 43/06 221/93 |
| 3,533,151 A | * | 10/1970 | Gaudry | ................. | F16C 43/065 29/898.065 |
| 6,397,471 B1 | * | 6/2002 | Okuno | ................... | F16C 43/08 29/898.064 |

(Continued)

FOREIGN PATENT DOCUMENTS

| | | | | | |
|---|---|---|---|---|---|
| CN | | 104989735 A | * | 10/2015 | |
| CN | | 113894523 A | * | 1/2022 | ............ B23P 19/007 |

(Continued)

OTHER PUBLICATIONS

Machine translation of WO-2018190296-A1 (Year: 2018).*
Machine translation of JP-2001121365-A (Year: 2001).*

*Primary Examiner* — Kyle A Cook
(74) *Attorney, Agent, or Firm* — Revolution IP, PLLC

(57) ABSTRACT

A ball cage assembly device according to an embodiment of the present disclosure may include a work table including a seating base; a cage supply unit that supplies a cage with a plurality of pockets formed in a groove shape on the seating base; a ball filling unit that supplies a plurality of balls onto the plurality of supplied pockets using their own weight; a ball press-fitting unit that moves up and down and press-fits the plurality of supplied balls into the plurality of pockets to create a ball cage assembly; and an assembly conveying unit that conveys the ball cage assembly.

5 Claims, 5 Drawing Sheets

(56) References Cited

U.S. PATENT DOCUMENTS

| | | | |
|---|---|---|---|
| 2006/0162151 A1* | 7/2006 | Takiwaki | B23P 19/003 |
| | | | 29/724 |
| 2015/0013164 A1* | 1/2015 | Nagasaki | F16C 43/06 |
| | | | 29/898.062 |
| 2017/0184152 A1* | 6/2017 | Taniguchi | F16C 43/065 |
| 2017/0363148 A1* | 12/2017 | Akanuma | B25J 13/00 |
| 2021/0108681 A1* | 4/2021 | Kojima | F16C 33/6651 |

FOREIGN PATENT DOCUMENTS

| | | | | |
|---|---|---|---|---|
| JP | 55077431 A | * | 6/1980 | F16C 43/065 |
| JP | 2001121365 A | * | 5/2001 | F16C 43/06 |
| JP | 2011194531 A | * | 10/2011 | F16C 19/364 |
| KR | 20080032736 A | * | 4/2008 | B30B 13/00 |
| KR | 10-1995399 B1 | | 7/2019 | |
| WO | WO-2018190296 A1 | * | 10/2018 | F16C 43/06 |

\* cited by examiner

BALL CAGE ASSEMBLY DEVICE FOR VEHICLE HUB BEARINGS

BACKGROUND

1. Field of the Invention

The present disclosure relates to a ball cage assembly device for vehicle hub bearings, and, more particularly, to a ball cage assembly device for vehicle hub bearings where all balls may be seated on pockets of a cage at once using their own weight to improve energy efficiency, the assembly may be carried out without the orientation and the restriction of the cage, the time to change its tools may be shortened, and separate tools may not be required.

The wheels of a vehicle are fastened to the outside of the hub bearing assembly. In the past, automobile companies produced hub bearing assemblies by assembling parts themselves, but have recently been receiving hub bearing assemblies from partner companies to improve productivity or ease maintenance.

The conventional process of assembling a ball cage consists of six steps: supply of a cage, supply of balls, combination of the balls and the cage, lowering of tools, secondary push, and release of the ball cage assembly, so that many tools are required and a lot of energy is consumed by loading balls individually onto pockets of the cage when distributing balls.

Therefore, there is a need for research on a ball cage assembly device for vehicle hub bearings where all balls are seated on pockets of a cage at once using their own weight to improve energy efficiency, the assembly can be carried out without the orientation and the restriction of the cage, the time to change its tools is shortened, and separate tools are not required.

2. Discussion of Related Art

Related Art Literature (Patent Literature 1) Korean Patent Registration No. 10-1995399

SUMMARY OF THE INVENTION

The present disclosure is aimed at providing a ball cage assembly device for vehicle hub bearings where all balls may be seated on pockets of a cage at once using their own weight to improve energy efficiency.

In addition, the present disclosure is aimed at providing a ball cage assembly device for vehicle hub bearings where the assembly may be carried out without the orientation and the restriction of the cage, the time to change its tools may be shortened, and separate tools may not be required.

Furthermore, the present disclosure is aimed at providing a ball cage assembly device for vehicle hub bearings that may guide balls through inclined long through holes so that the balls may be stably seated on pockets without bouncing off the pockets.

A ball cage assembly device according to an embodiment of the present disclosure may include a work table including a seating base: a cage supply unit that supplies a cage with a plurality of pockets formed in a groove shape on the seating base: a ball filling unit that supplies a plurality of balls onto the plurality of supplied pockets using their own weight: a ball press-fitting unit that moves up and down and press-fits the plurality of supplied balls into the plurality of pockets to create a ball cage assembly; and an assembly conveying unit that conveys the ball cage assembly.

According to an embodiment of the present disclosure, the ball filling unit may include a ball mounting unit that sequentially drops a plurality of balls: a shutter table unit that seats the plurality of falling balls and guides them onto the plurality of pockets; and a table conveying unit that conveys the shutter table unit so that the plurality of falling balls are radially spaced apart from each other on the upper surface of the shutter table unit and the shutter table unit moves up and down between the lower end of the ball mounting unit and the top of the cage.

According to an embodiment of the present disclosure, the shutter table unit may include a table plate coupled to the table conveying unit and formed in the shape of a plate with a central hole; a shutter bracket formed to a preset thickness on the upper surface of the table plate and having a circular hole in the center and an opening that penetrates to the circular hole on one side; a shutter formed in the shape of a disk with a protrusion at one point of the outer circumferential surface and having a plurality of through holes that are radially spaced apart from each other and through which the plurality of balls pass: a shutter block including a plurality of long through holes that penetrate from an inlet part having the same spacing and size as the plurality of through holes to an outlet part having the same spacing and size as the plurality of pockets to guide the plurality of balls onto the plurality of pockets; and a shutter rotation cylinder combined with the protrusion to rotate the shutter at a preset angle.

In the case of the ball cage assembly device according to an embodiment of the present disclosure, the plurality of through holes and the plurality of long through holes may be crossed at a first time point so that the plurality of balls may be seated on the upper surface of the shutter block, and may then be overlapped at a second time point when the shutter rotates at a preset angle by the shutter rotation cylinder so that the plurality of balls may fall and be guided to the upper part of the plurality of pockets along the long through holes.

According to an embodiment of the present disclosure, the shutter block may include a first shutter block having a cylindrical shape; and a second shutter block coupled to the bottom of the first shutter block and having the shape of a tapered cylinder with the lower surface smaller than the upper surface, the long through hole may include a first long through hole formed vertically in the first shutter block; and a second long through hole formed in the second shutter block and inclined at a preset angle toward the central axis of the second shutter block toward the bottom, and the ball mounting unit may seat the plurality of balls on the shutter table unit using a circular interpolation function by simultaneously operating two axes of a servo.

In the case of the ball cage assembly device for vehicle hub bearings according to an embodiment of the present disclosure, it may be possible to seat all balls on pockets of a cage at once using their own weight so as to improve energy efficiency.

In addition, in the case of the ball cage assembly device for vehicle hub bearings according to an embodiment of the present disclosure, the assembly may be carried out without the orientation and the restriction of the cage, the time to change its tools may be shortened, and separate tools may not be required.

Furthermore, the ball cage assembly device for vehicle hub bearings according to an embodiment of the present disclosure may guide balls through inclined long through holes so that the balls may be stably seated on pockets without bouncing off the pockets.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the specific embodiments of the present disclosure will be described in detail with reference to the drawings. However, the technology of the present disclosure is not limited to the presented embodiments, and a person having ordinary skill in the art who understands the technology of the present disclosure will be able to easily suggest other retrograde disclosures or other embodiments within the scope of the technology of the present disclosure, which will also be said to be within the scope of the technology of the present disclosure, by adding, changing, or deleting other components within the scope of the same technology.

Hereinafter, a ball cage assembly device 100 for vehicle hub bearings according to the present disclosure will be described in detail with reference to the attached FIGS. 1 to 5.

Figure 1:
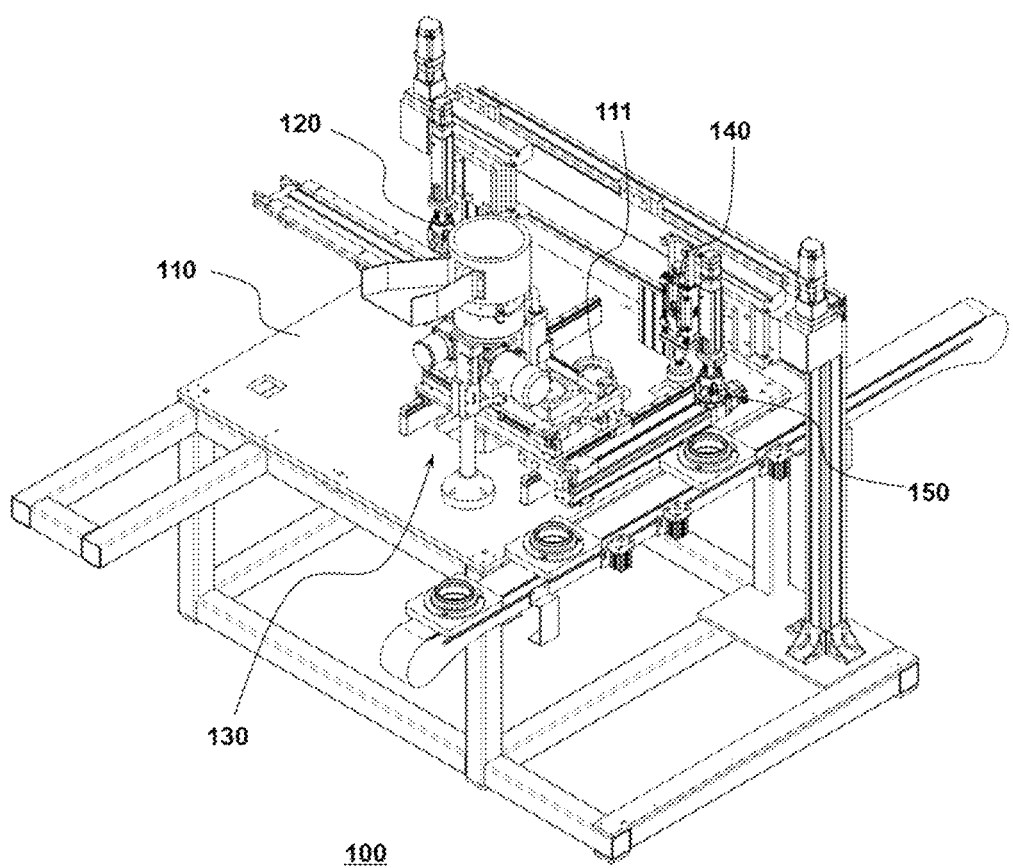
FIG. 1 is a view for illustrating a ball cage assembly device for vehicle hub bearings according to an embodiment of the present disclosure.

FIG. 1 is a view for illustrating the ball cage assembly device for vehicle hub bearings according to an embodiment of the present disclosure.

Referring to FIG. 1, the ball cage assembly device 100 according to an embodiment of the present disclosure may include a work table 110, a cage supply unit 120, a ball filling unit 130, a ball press-fitting unit 140, and an assembly conveying unit 150.

The work table 110 may include a seating base 111. The seating base 111 may be formed in a cylindrical shape with an internal space on the upper surface of the work table 110. A support portion (not shown) may be formed in the internal space in a shape that allows a cage to be accurately seated in a predetermined position. In addition, when a shutter table unit 132 moves above the seating base 111, the seating base 111 may rise, narrowing the gap between the shutter table unit 132 and the seating base 111. As a result, it may be possible to prevent balls from leaving by setting the optimal spacing for each model.

The cage supply unit 120 may supply a cage including a plurality of pockets formed in a groove shape onto the seating base 111. The groove shape may correspond to the shape of balls.

The ball filling unit 130 may supply a plurality of balls using their own weight onto the plurality of supplied pockets. The ball filling unit 130 will be more closely examined with reference to FIG. 2.

Figure 2:
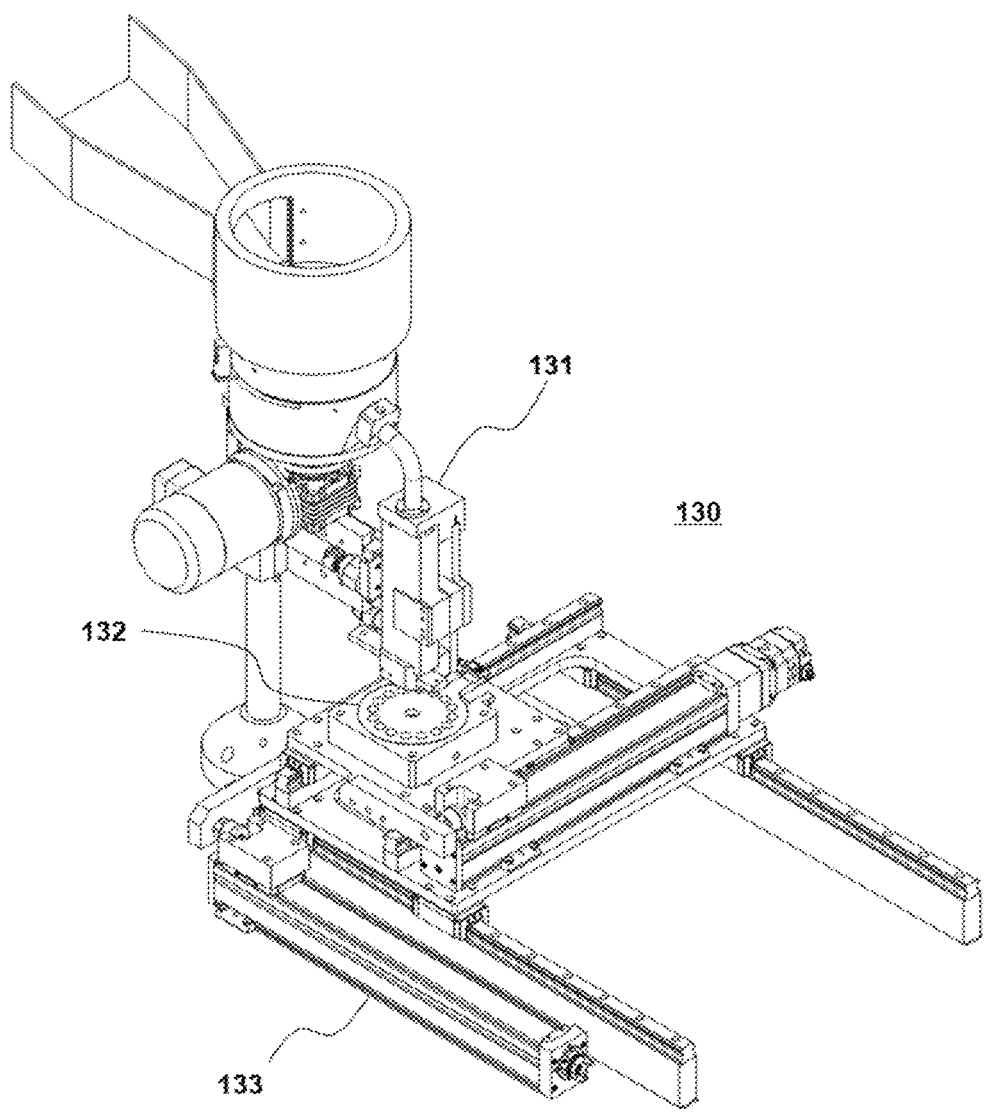
FIG. 2 is a view for illustrating a ball filling unit according to an embodiment of the present disclosure.

FIG. 2 is a view for illustrating the ball filling unit according to an embodiment of the present disclosure.

Referring to FIG. 2, the ball filling unit 130 according to an embodiment of the present disclosure may include a ball mounting unit 131, the shutter table unit 132, and a table conveying unit 133.

The ball mounting unit 131 may sequentially drop multiple balls. A bowl feeder (not shown) formed on the upper part of the ball mounting unit 131 may supply balls, and the ball mounting unit 131 may receive a plurality of balls from the bowl feeder and drop a preset number of balls one by one. In addition, the ball mounting unit 131 may seat the plurality of balls on the shutter table unit 132 using a circular interpolation function by simultaneously operating two axes of a servo. When data on the radius of balls is entered into the ball mounting unit 131, a movement path may be created according to the radius of balls entered using the circular interpolation function.

The shutter table unit 132 may seat the plurality of falling balls and guide the plurality of settled balls onto the plurality of pockets. The shutter table unit 132 will be more closely examined with reference to FIG. 3.

Figure 3:
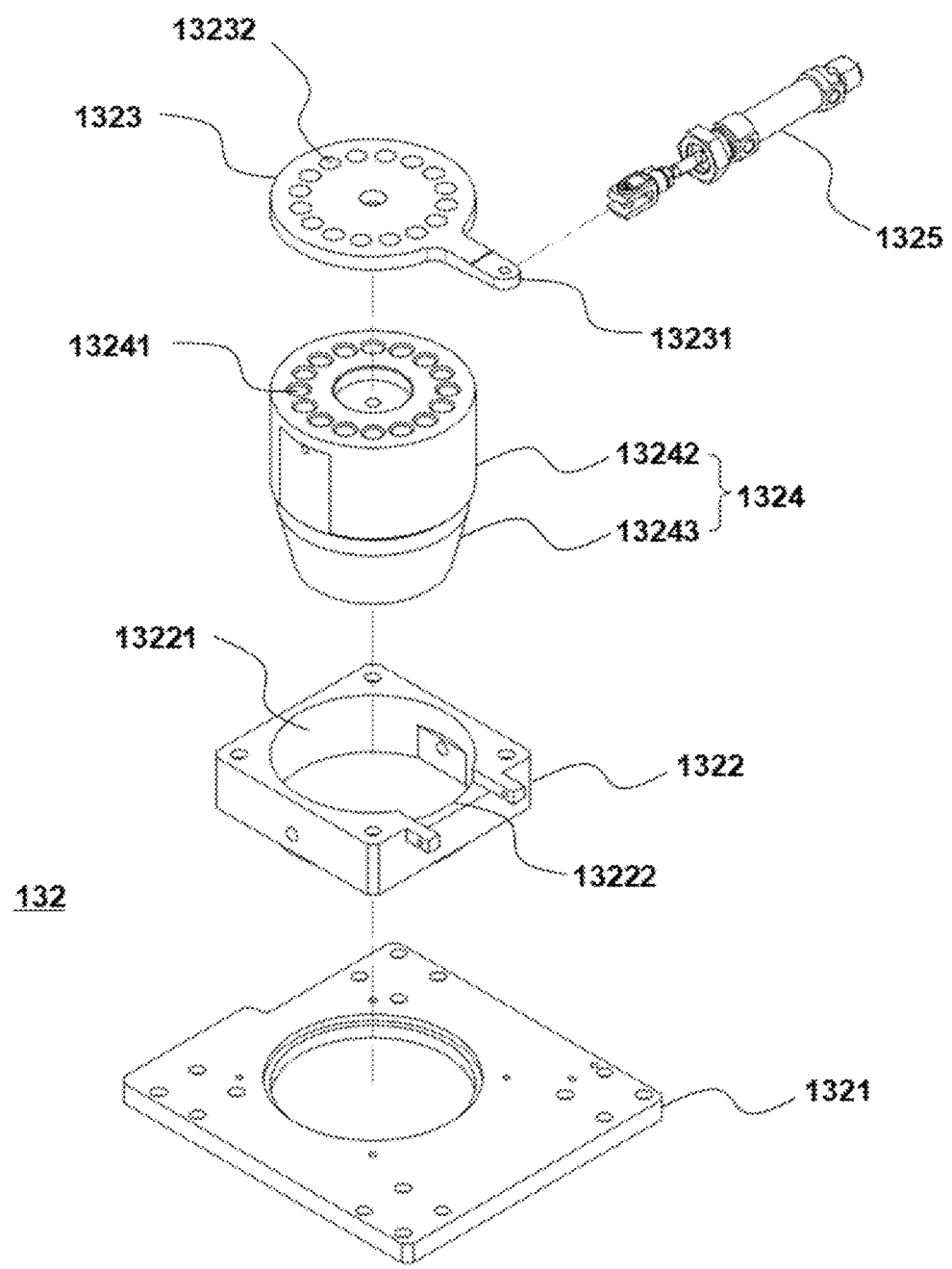
FIG. 3 is an exploded perspective view of a shutter table unit according to an embodiment of the present disclosure.

FIG. 3 is an exploded perspective view of the shutter table unit according to an embodiment of the present disclosure.

Referring to FIG. 3, the shutter table unit 132 according to an embodiment of the present disclosure may include a table plate 1321, a shutter bracket 1322, a shutter 1323, a shutter block 1324, and a shutter rotation cylinder 1325.

The table plate 1321 may be coupled to the table conveying unit 133 and may be formed in the shape of a plate with a central hole.

The shutter bracket 1322 may be formed to a preset thickness on the upper surface of the table plate 1321, and may have a circular hole 13221 in the center and an opening 13222 that penetrates to the circular hole 13221 on one side.

The shutter 1323 may be formed in the shape of a disk with a protrusion 13231 at one point of the outer circumferential surface, and may have a plurality of through holes 13232 that are radially spaced apart from each other and through which the plurality of balls pass. The protrusion 13231 may be located on the opening 13222.

The shutter block 1324 may include a plurality of long through holes 13241 that penetrate from an inlet part a having the same spacing and size as the plurality of through holes 13232 to an outlet part b having the same spacing and size as the plurality of pockets to guide the plurality of balls to the plurality of pockets. The shutter block 1324 will be more closely examined with reference to FIG. 4.

Figure 4:
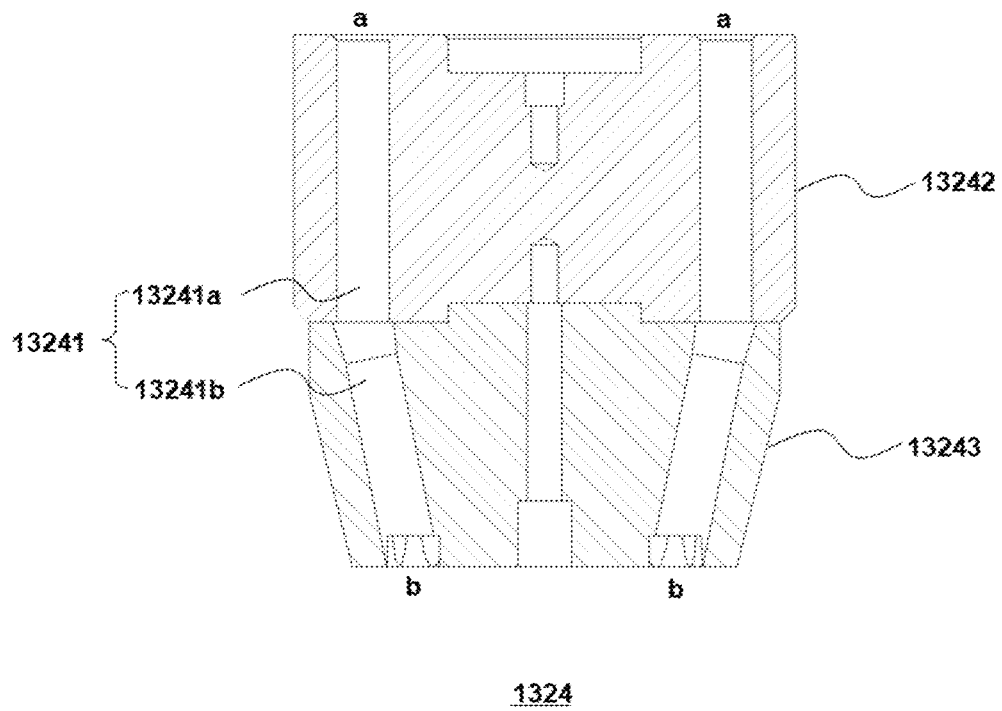
FIG. 4 is a cross-sectional view of a shutter block according to an embodiment of the present disclosure.

FIG. 4 is a cross-sectional view of the shutter block according to an embodiment of the present disclosure.

Referring to FIG. 4, the shutter block 1324 according to an embodiment of the present disclosure may include a first shutter block 13242 and a second shutter block 13243.

The first shutter block 13242 may have a cylindrical shape.

The second shutter block 13243 may be coupled to the bottom of the first shutter block 13242 and may have the shape of a tapered cylinder with the lower surface smaller than the upper surface.

In addition, the long through hole 13241 may include a first long through hole 13241a and a second long through hole 13241b.

The first long through hole 13241*a* may be formed vertically in the first shutter block 13242.

The second long through hole 13241*b* may be formed in the second shutter block 13243, and may be inclined at a preset angle toward the central axis of the second shutter block 13243 toward the bottom.

The long through hole 13241 may tilt toward the central axis, so that it may be possible to stably guide balls to prevent them from bouncing off the pockets.

Figure 5:
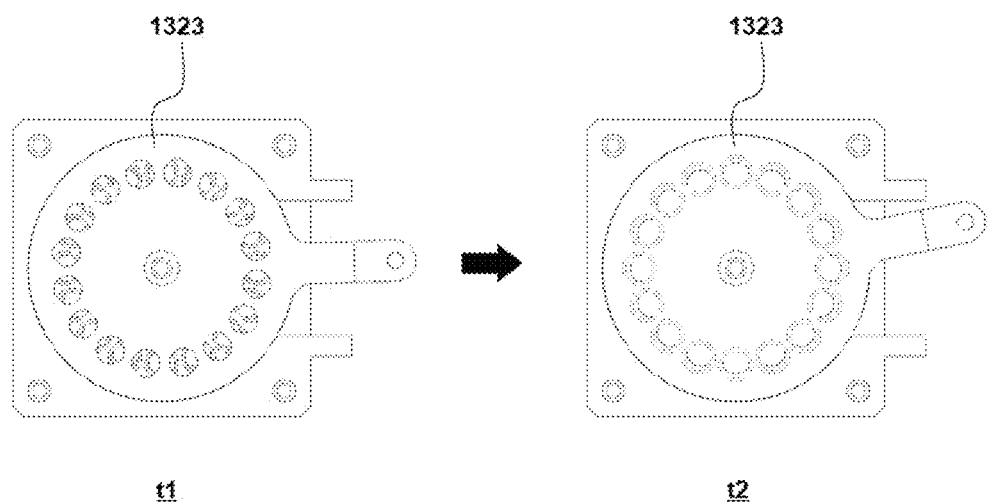
FIG. 5 is a view of the shutter table unit at a first time point and then at a second time point according to an embodiment of the present disclosure.

Referring back to FIG. 3, the shutter rotation cylinder 1325 may be combined with the protrusion 13231 to rotate the shutter 1323 at a preset angle. With reference to FIG. 5, the operation of the shutter rotation cylinder 1325 will be examined more closely.

FIG. 5 is a view of the shutter table unit at a first time point and then at a second time point according to an embodiment of the present disclosure.

Referring to FIG. 5, the plurality of through holes 13232 and the plurality of long through holes 13241 may be crossed at the first time point t1 so that the plurality of balls may be seated on the upper surface of the shutter block 1324, and may then be overlapped at the second time point t2 when the shutter 1323 rotates at a preset angle by the shutter rotation cylinder 1325 so that the plurality of balls may fall and be guided to the upper part of the plurality of pockets along the long through holes 13241. In other words, the central axis of the through hole 13232 and the central axis of the inlet part of the long through hole 13241 may not align at the first time point t1 and may then align at the second time point t2 so that the ball may fall.

Referring back to FIG. 2, the table conveying unit 133 may convey the shutter table unit 132 so that the plurality of falling balls may be radially spaced apart from each other on the upper surface of the shutter table unit 132 and the shutter table unit 132 may move up and down between the lower end of the ball mounting unit 131 and the top of the cage. The shutter table unit 132 may be designed to move on the x-axis and the y-axis. The table conveying unit 133 may convey the shutter table unit 132 so that the shutter table unit 132 may fill the shutter 1323 with the balls from the bottom of the ball mounting unit 131 and move to the top of the cage to drop the balls.

Referring back to FIG. 1, the ball press-fitting unit 140 may move up and down to press-fit the plurality of supplied balls into the plurality of pockets and create a ball cage assembly.

The assembly conveying unit 150 may convey the ball cage assembly. It may be possible to use the assembly conveying unit 150 for general purposes because its position can be modified through simple adjustment of the servomotor that moves on two axes even when the model of a bearing to be assembled is changed.

In addition, the ball cage assembly device 100 for vehicle hub bearings according to an embodiment of the present disclosure may further include a load management unit (not shown), although it is not shown in the drawings.

The load management unit may manage the load values of all of the cage supply unit 120, the ball filling unit 130, the ball press-fitting unit 140, and the assembly conveying unit 150.

The load management unit may give an alarm when the load values of the cage supply unit 120, the ball filling unit 130, the ball press-fitting unit 140, and the assembly conveying unit 150 exceed normal values, and may collect process data to systemize prevention and maintenance.

In addition, because the cage supply unit 120, the ball press-fitting unit 140, and the assembly conveying unit 150 may share one gantry loader (orthogonal robot) on a straight line, the size of the device and the space it occupies can be reduced, energy efficiency can be improved, and the equipment can be efficiently preserved.

Furthermore, the ball cage assembly device for vehicle hub bearings according to an embodiment of the present disclosure may further include an oscillator (not shown).

The oscillator may be placed on the seating base 111 and may shake each ball so that it may accurately enter each groove of the cage after the balls have freely fallen on the cage.

As examined above, according to an embodiment of the present disclosure, it may be possible to improve energy efficiency by seating all balls on the pockets of the cage at once using their own weight.

In addition, in the case of the ball cage assembly device for vehicle hub bearings according to an embodiment of the present disclosure, it may be possible to carry out the assembly without the orientation and the restriction of the cage. Furthermore, the time to change tools of the assembly device may be shortened, and there may be no need to use separate tools.

In addition, the ball cage assembly device for vehicle hub bearings according to an embodiment of the present disclosure may guide balls through inclined long through holes, so that the balls may be stably seated on the pockets without bouncing off the pockets.

As shown above, one embodiment of the present disclosure has been described with the limited examples and drawings. However, one embodiment of the present disclosure is not limited to the above-described examples, and various modifications and variations can be derived from the description by a person having ordinary skill in the technical field to which the present disclosure pertains. Accordingly, one embodiment of the present disclosure should be understood only based on the claims set forth below, and all equivalents or equivalent modifications thereof should be deemed to fall within the scope of the technology of the present disclosure.

What is claimed is:

1. A ball cage assembly device comprising:
   a work table including a seating base;
   a cage supply unit including a gantry loader configured to place a cage onto the seating base, the cage including a plurality of pockets, each pocket formed in a groove shape;
   a ball filling unit that supplies a plurality of balls onto the plurality of pockets using their own weight;
   a ball press-fitting unit that moves up and down and press-fits the plurality of balls into the plurality of pockets to form a ball cage assembly; and
   an assembly conveying unit including the gantry loader configured to convey the ball cage assembly.

2. The ball cage assembly device of claim 1, wherein the ball filling unit includes:
   a ball mounting unit that sequentially drops the plurality of balls;
   a shutter table unit that seats the plurality of balls as the plurality of balls fall and guides the plurality of balls onto the plurality of pockets; and
   a table conveying unit that moves the shutter table unit such that the plurality of balls are circumferentially spaced apart from each other on an upper surface of the shutter table unit, and such that the shutter table unit moves up and down between a lower end of the ball mounting unit and an upper surface of the cage.

3. The ball cage assembly device of claim 2, wherein the shutter table unit includes:
- a table plate coupled to the table conveying unit and formed in the shape of a plate with a central hole;
- a shutter bracket disposed on an upper surface of the table plate, the shutter bracket having a preset thickness, a circular hole in the center, and an opening on one side that leads into the circular hole;
- a shutter formed in the shape of a disk, a protrusion being provided at one point on an outer circumferential surface of the disk, the shutter having a plurality of through holes that are circumferentially spaced apart from each other and through which the plurality of balls pass;
- a shutter block including a plurality of through holes that extend from an inlet part having spacing and size corresponding those of the plurality of through holes of the shutter to an outlet part having spacing and size corresponding to those of the plurality of pockets, thereby guiding the plurality of balls onto the plurality of pockets; and
- a shutter rotation cylinder coupled to the protrusion to rotate the shutter at a preset angle.

4. The ball cage assembly device of claim 3, wherein the plurality of through holes of the shutter and the plurality of through holes of the shutter block are misaligned at a first time point such that the plurality of balls remain seated on an upper surface of the shutter block, and become aligned at a second time point when the shutter rotates by the preset angle via the shutter rotation cylinder, such that the plurality of balls fall and are guided to an upper part of the plurality of pockets through the through holes of the shutter block.

5. The ball cage assembly device of claim 3, wherein:
- the shutter block comprises a first shutter block having a cylindrical shape, and
- a second shutter block coupled to a e bottom of the first shutter block and having a tapered cylindrical shape with a lower surface of the second shutter block that is smaller than an upper surface of the second shutter block;
- the through holes of the shutter block comprise
- a first through hole formed vertically in the first shutter block, and
- a second through hole formed in the second shutter block, the second through hole being inclined at a second preset angle toward a central axis of the second shutter block as it extends downward through the second shutter block; and
- the ball mounting unit seats the plurality of balls on the shutter table unit using a circular interpolation function by simultaneously operating two axes of a servo.

\* \* \* \* \*